United States Patent [19]
Woehler

[11] Patent Number: 5,339,224
[45] Date of Patent: Aug. 16, 1994

[54] AIRPORT BEACON

[75] Inventor: Gary B. Woehler, Crosby, Minn.

[73] Assignee: Hali-Brite, Inc., Crosby, Minn.

[21] Appl. No.: 16,787

[22] Filed: Feb. 11, 1993

[51] Int. Cl.[5] .................................................. F21V 21/30
[52] U.S. Cl. ................................................................ 362/35
[58] Field of Search ............................................ 362/35

[56] References Cited

U.S. PATENT DOCUMENTS

| | | |
|---|---|---|
| 926,781 | 7/1909 | Townsend . |
| 1,629,506 | 5/1927 | Jensen . |
| 3,014,192 | 12/1961 | Leslie ................................. 339/5 |
| 4,146,919 | 3/1979 | Jennings ............................ 362/35 |
| 4,229,781 | 10/1980 | Hitora ............................... 362/274 |
| 4,626,966 | 12/1986 | Bleiwas et al. .................... 362/35 |
| 4,717,991 | 1/1988 | Murphree, Jr. .................... 362/35 |
| 4,777,568 | 10/1988 | Solomon ............................ 362/35 |
| 4,931,768 | 6/1990 | Jincks et al. ...................... 340/473 |
| 4,970,627 | 11/1990 | Beaumont et al. ................ 362/35 |

Primary Examiner—Carroll B. Dority
Attorney, Agent, or Firm—Westman, Champlin & Kelly

[57] ABSTRACT

An improved airport beacon in which a lens assembly is rotated around a stationary lamp thereby enabling the lamp to be connected to a source of electrical energy without the use of slip rings.

11 Claims, 3 Drawing Sheets

AIRPORT BEACON

BACKGROUND OF THE INVENTION

The present invention relates in general to airport beacons which produce a bright signal as a visual aid for airplane pilots in locating airports during night flights, etc. In particular, the present invention relates to an airport beacon having a rotatable lens assembly.

Airport beacons produce and sweep a bright light through a complete 360 degree revolution as an aid to aerial navigation. Historically, airport beacons have used high powered incandescent lamps having a relatively short life. In order to decrease the inconvenience and costs of frequent bulb changes, automated bulb changer assemblies were mounted within and rotated with a lens assembly. In these arrangements, slip rings were used to carry power up to the rotating lamp, and various other components such as transformers and capacitors were mounted within and rotated with the lens and lamp assembly so that only a low voltage had to be applied across the slip rings.

Slip rings are still in use today as evidenced by U.S. Pat. No. 4,717,991 to Murphree, Jr. which discloses a metal halide lamp which rotates simultaneously with a lamp housing having a color coded lens assembly. A transformer, capacitor and photoelectric switch are mounted under a heat shield and also rotated with the housing and lamp.

Due to the inconvenience and expense of maintaining airport beacons, low maintenance components are desired. Slip rings are a high maintenance component which must be cleaned regularly to remove carbon and possible grease and dirt build-up on the rings and brushes.

Another high maintenance component of the present airport beacon lights is the worm gear drive system currently used to drive the lens and lamp assembly. The worm gear drive system has a relatively short life and must be greased at least twice a year in order to maintain adequate performance.

SUMMARY OF THE INVENTION

The present invention relates to an improved airport beacon in which a lens assembly is rotated around a stationary lamp thereby enabling the lamp to be connected to a source of electrical energy without using slip rings. More specifically, the airport beacon comprises a stationary housing member having an upwardly facing first opening; a rotatable lamp housing member including a lens assembly mounted thereto, and a drive shaft fixed to the rotatable housing member and formed around a second opening in the rotatable lamp housing. The drive shaft extends through the first opening into the stationary housing member and is rotatably supported on the stationary housing. A lamp support tube has a first end fixedly mounted to the stationary housing member, and extends through the center passage of the drive shaft and the first opening into the rotatable lamp housing. A high intensity lamp is mounted on the lamp support tube within the lamp housing and aligned with the lens assembly. The high intensity lamp is connected to an electrical source. The drive shaft is rotated around the lamp support tube such that the lens assembly is rotated around the stationary lamp.

DETAILED DESCRIPTION OF THE PREFERRED EMBODIMENTS

Figure 1:
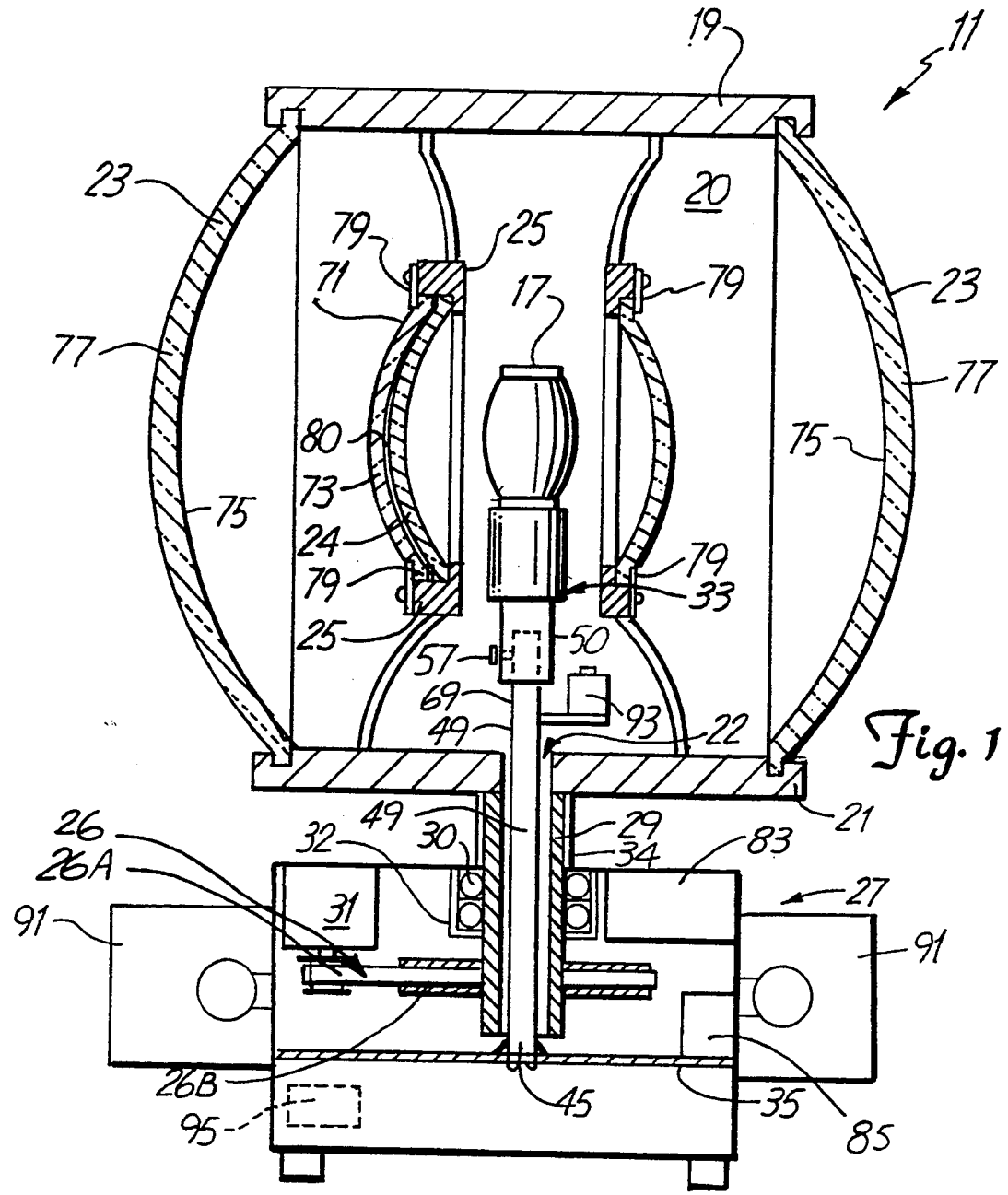
FIG. 1 is a sectional view of an airport beacon light of the present invention.

The airport beacon 11 of the present invention is powered with a source 13 of electrical energy (FIG. 3) such as the typical alternating current source available at an airport to produce a bright, color coded signal as a visual aid for airplane pilots and the like. The airport beacon 11 is typically mounted on a beacon support tower (not shown) of any suitable construction.

The airport beacon 11 includes a metal halide lamp 17 such as a typical 400 watt unit having a life expectancy of 20,000 hours. The General Electric Company, Lightings Systems Dept., Hendersonville, N.C., manufactures such a lamp as model number MVR 400 U.

The airport beacon 11 includes a rotatable lamp housing member 19 having a hollow interior 20, a base plate 21 having an opening 22 therethrough into the hollow interior 20, a lens 23, and associated structure to define an optic system. The specific design of the lamp housing member 19 with the lens 23 may vary in any manner now apparent to those skilled in the art. Commonly, the lamp housing member 19 is made from metal having one or more access doors (not shown) into the interior 20 thereof and may include various components such as magnifiers, reflectors, doublets and the like that combine with the lens 23 to form the optic system. The lamp housing member 19 shown in FIG. 1, consists of a signal head, double beacon type unit which produces two light beams or signals directed opposite one another. The optic system of the lamp housing member 19 includes color coding means for coding the color of the light projected from at least one lens. Thus, one of the doublets of the lamp housing member 19 acts as a color coding doublet lens 24, and is constructed out of green glass and mounted within the interior 20 of the lamp housing member 19 by way of a spider ring 25 or the like to produce a green light. The opposite lens is typically clear although some beacons have three lenses for tri-color signals.

The lamp housing member 19 has a tubular drive shaft 29 fixed to the base plate 21 and aligned with the opening 22. The drive shaft 29 extends through a first opening in a stationary base housing member 27 and is rotatably mounted to the stationary base housing member 27 through bearings 30 supported in a hub 32 fixed to the base housing member 27. A sleeve 34, the hub 32 and the bearings 30 also serve to properly align the drive shaft 29 with respect to the base housing member 27 to prevent wobbling of the lens assembly 23 during rotation around the lamp 17 so as to maintain the position of the lamp 17 relative to the lens assembly 23. If desired, the hub 32 may be positioned on an exterior surface of the base housing member. The sleeve 34 surrounds the exterior of the drive shaft 29 and covers the first opening of the base housing member 27 to further prevent water and other elements from entering the base housing member 27. The base housing member 27 is fixedly mounted to the beacon support tower (not shown) such that the airport beacon 11 produces rotating light beams or signals.

Drive means 26 positioned within the base housing member 27 and attached to the drive shaft 29 of the lamp housing member 19 rotates the lamp housing member 19 about the stationary lamp 17. In the embodiment illustrated, the drive means 26 includes a gear 26B attached to an outer end of the drive shaft 29, and a motor 31 coupled to the gear 26B either directly or through a cog belt 26A for rotating the drive shaft 29 and lamp housing member 19. The gear 26B and cog belt 26A are low maintenance parts requiring no oil and/or maintenance and having a longer life than the worm gear drive of prior art airport beacons.

Figure 2:
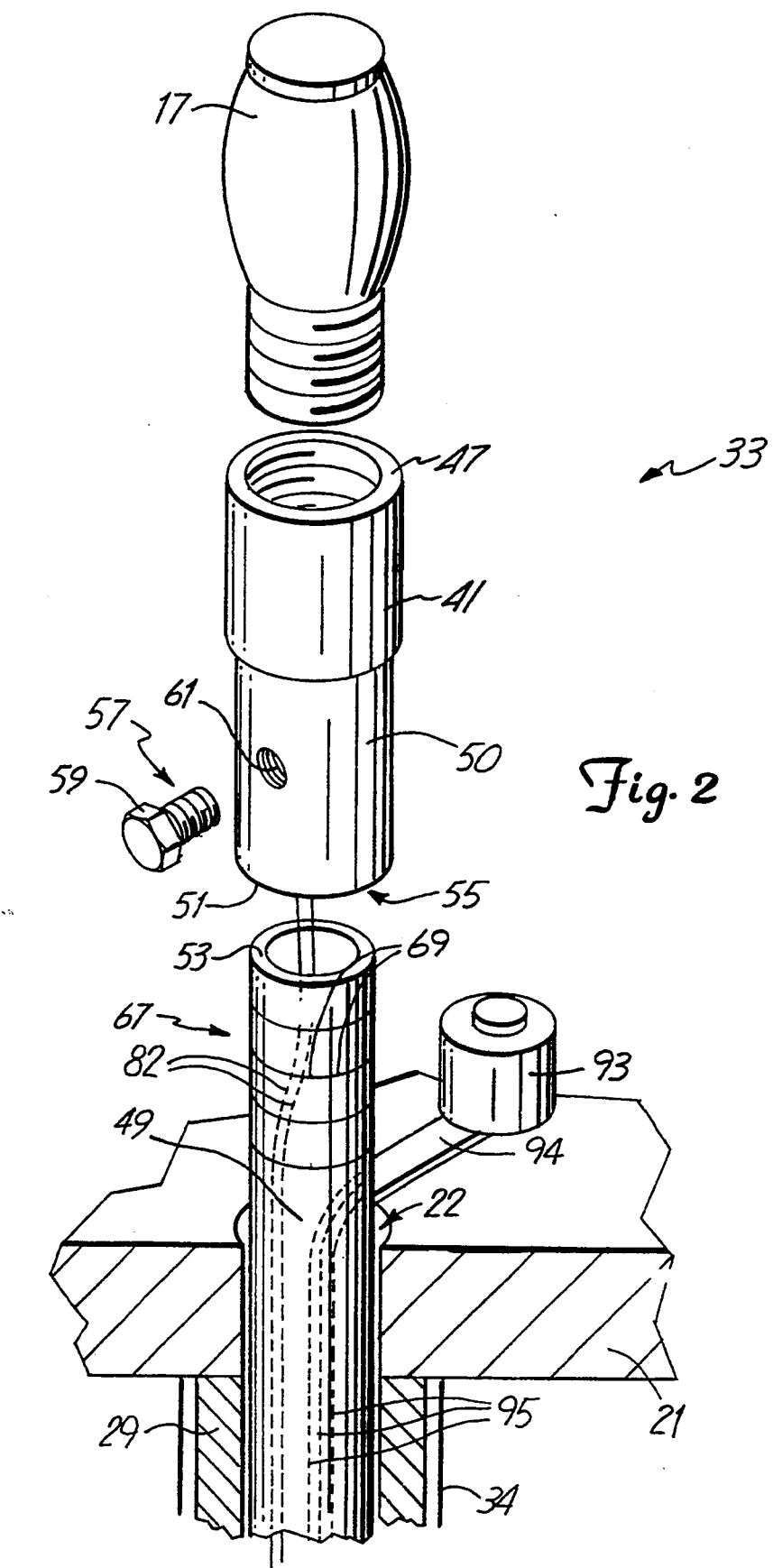
FIG. 2 is an enlarged view of a portion of the airport beacon light of FIG. 2.

The airport beacon 11 includes a stationary lamp support 33 which extends into the interior 20 of the housing lamp member 19 for holding the lamp 17 in a location adjacent to and aligned with the lens 23 (FIGS. 1 and 2). The lamp support 33 includes a base member 35, a lamp socket 41, and an elongated support tube 49 connecting the base member 35 to the lamp socket 41. The base member 35 consists of a rectangular metal plate fixedly attached to the base housing member 27 by way of bolts or the like. The specific construction and method of attachment of the base member 35 may vary depending on the specific construction of the bare housing member 27. As illustrated, in FIG. 2, the lamp socket 41 has a first end 47 for holding lamp 17 and a second end 51 for attaching the lamp socket 41 to the support tube 49. As described below, the lamp socket 41 is adjustable relative to the base member 35 for allowing the position of the lamp 17 relative to the lens 23 and associated structure to be adjusted. The specific construction of the lamp socket 41 will be apparent to those skilled in the art such as lamp socket model number 8694-4 manufactured by Leviton Manufacturing Co., Inc., Little Neck, N.Y. The lamp support tube 49 has a first end 45 attached to the base member 35 (FIG. 1) and a second end 53 mating with the second end 51 of the lamp socket 41 (FIG. 2). The support tube 49 and lamp socket 50 are thus held stationary to the base housing member 27 while the lamp housing member 19 is rotated around the lamp 17 and lamp support 33.

Referring to FIG. 2, the support tube 49 and lamp socket 50 are movably attached to one another in a telescopic-like manner to allow the lamp socket 41 to be moved toward and away from the base member 35 thereby allowing the position of the lamp 17 to be adjusted within the interior 21 of the lamp housing member 19. The second end 51 of the lamp socket 41 has a cavity 55 and the second end 53 of the support tube 49 is shaped and sized so as to slidably fit within the cavity 55 to thereby allow the support tube 49 and lamp socket 50 to slidably move relative to one another. The lamp support 33 includes lock means 57 for selectively preventing movement of the support tube 49 and lamp socket 50 relative to one another. Lock means 57 consists of a screw 59 or the like adapted to pass through a threaded aperture 61 in the lamp support 50 adjacent the second end 51 thereof and adapted to screw against the support tube 49 adjacent the second end 53 thereof to thereby fixedly attach or lock the lamp socket 50 and support tube 49 relative to one another.

The lamp support 33 is calibrated for accurate positioning of the location of the lamp 17 within the interior 21 of the lamp housing member 19. More specifically, the lamp support means 33 includes indicia means 67 for indicating the relative positions of the support tube 49 and lamp socket 50 and for accurately calibrating the relative position of the lamp 17 with respect to the lens 23 and associated structure. The indicia means 67 includes indicia marks 69 such as grooves or the like formed in the outer surface of the support tube 49 and spaced apart from one another whereby the relative position of the lamp within the interior 21 of the lamp housing member 19 is indicated by observing which indicia mark 69 the second end 51 of the lamp socket 50 is aligned. The relative position of the lamp 17 within the interior 20 of the lamp housing member 19 determines the angle of the light beam or signal produced by the airport beacon 11. More specifically, the lamp 17 is normally adjusted to produce a light beam or signal at an optimum 4° above horizontal. However, this setting can easily be readjusted to fit any particular situation by merely loosening the screw 59 and either lowering or raising the lamp socket 50 relative to the support rod 49 and then re-tightening the screw 59. The exact amount of movement to change the light beam one or more degrees relative to the horizontal depends on the structure of the components of the optical system. However, for easy reference, the indicia marks 69 are spaced apart from one another a distance substantially equal to the distance necessary to move the light beam 1° relative to horizontal.

Referring to FIG. 1, the airport beacon 11 includes color correcting means 71 mounted adjacent the lens 23 for correcting the color of the light produced by the lamp 17 through the lens 23. The color correcting means 71 includes a transparent auxiliary lens member 73 positioned on one side of the lens 23. The lens 23 has an interior side 75 and an exterior side 77 and the auxiliary lens member 73 is mounted adjacent the interior side 75 of the lens 23. The auxiliary lens member 73 is constructed of transparent green thermoplastic such as, for example, one-eighth inch thick No. 2414 green "plexiglass" by a heating and blowing process to form a bubble to a dimension and size so as to completely blanket the interior side 75 of the lens 23. Clips 79 attach the auxiliary lens member 73 a spaced distance from the lens 23. The auxiliary lens member 73 is attached to the color coding doublet lens 24 that is positioned between the lamp 17 and lens 23 such that there is an open air space 80 between the lens member 73 and the doublet lens 24 to provide a heat insulating barrier.

Figure 3:
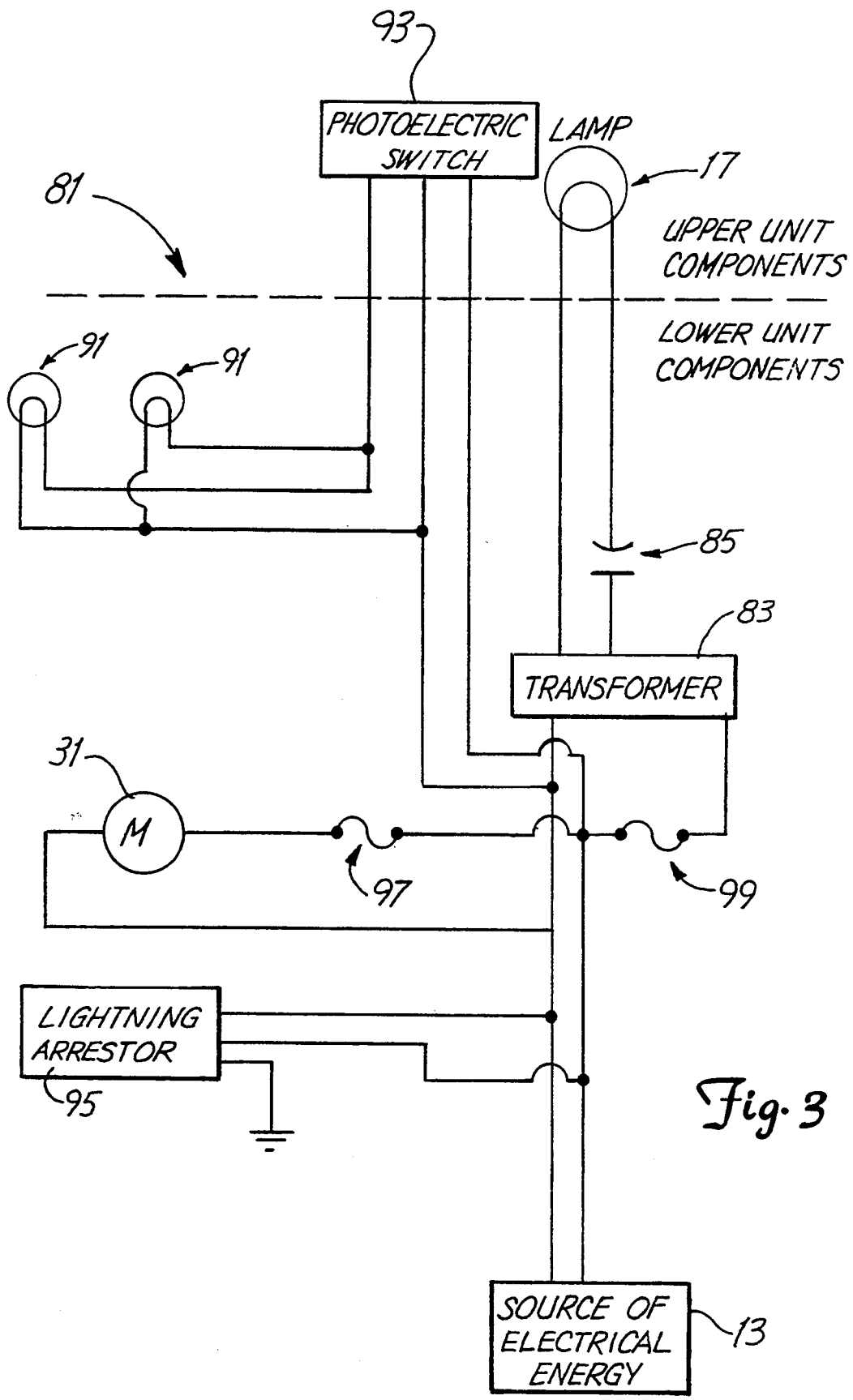
FIG. 3 is a diagrammatic schematic view of the various electrical components of the airport beacon light of the present invention.

Referring to FIGS. 2 and 3, the airport beacon 11 includes circuit means 81 for electrically coupling the lamp 17 to the source 13 of electrical energy. The circuit means 81 includes typical electrically conductive lead wires 82 extending between the stationary lamp 17 and source of electrical energy 13 and passing through the support tube 49 and lamp socket 50 such that slip rings are not needed on the drive shaft 29. Alternatively, the lamp lead wires 82 may be wrapped around the support tube 49 between the support tube 49 and the drive shaft 29. In other words, the support tube 49 may be replaced by a solid rod. The circuit means 81 includes a transformer 83 to step up the voltage to the metal halide lamp 17 and a capacitor 85 to block direct current; both the transformer 83 and capacitor 85 are mounted within the interior of the stationary base housing member 27 as opposed to within the interior 20 of the lamp housing member 19 since the lamp 17 is stationary and since slip rings are not needed to supply power to the lamp. The transformer 83 and capacitor 85 may be constructed as a unit such as the model number 1130-93-R500K manufactured by Universal Manufacturing Corp. of Paramus, N.J.

In the embodiment illustrated, the airport beacon 11 includes one or more obstruction lights 91 fixedly mounted relative to the base housing member 27 for providing an obstruction marker light. The obstruction lights 91 are fixedly mounted directly to the base housing members 27, or to the beacon support (not shown), or lamp housing member 19 to provide a clear indication of the airport beacon 11 if the lamp 17 fails to operate. Obstruction lights 91 are well known to those skilled in the art and are electrically coupled to the source 13 of electrical energy and a photoelectric switch 93 (FIGS. 2 and 3). The photoelectric switch 93, positioned within the interior 20 of the lamp housing member 19 and coupled to the circuit means 81, breaks the circuit between the source 13 of electrical energy and the obstruction lights 91 when the lamp 17 is producing light. A support plate 94 attaches the photoelectric switch 93 to the support tube 49 so that the photoelectric switch does not rotate and so that control leads 95 pass either through the interior of the support tube 49 or around the exterior of the support tube 49 between the support tube 49 and the drive shaft 29 to the other components in the system. The photoelectric switch 93 consists of any typical unit well known to those skilled in the art such as the model number 2101 manufactured by Tork of Mount Vernon, N.Y. The light produced by the lamp 17 within the interior 20 of the lamp housing member 19 is sufficient to open the photoelectric switch 93, thereby increasing energy savings since the obstruction lights 91 are not necessary when the lamp 17 is operating.

A lightning arrestor 95 of any well-known construction protects the circuit means 81 and is coupled thereto. Delta Lightning Arrestors, Inc. of Big Spring, Tex. manufactures such a unit.

Additionally, the circuit means 81 is provided with a first fuse 97 for protecting the motor means 31 and a second fuse 99 for protecting the lamp 17 and associated lighting circuitry as shown in FIG. 3. Typical terminal blocks and the like (not shown) are also provided as will be apparent to those skilled in the art to ensure proper transmission of electrical energy from the source 13.

Additionally, all exposed electrical wires consist of "Teflon" high temperature wire or are sleeved with heat resisting sleeves in any manner now apparent to those skilled in the art.

It should also be noted that the need for the color correcting means 71 is due to the change from the prior incandescent lamp to the metal halide lamp. That is, the typical color coding means 24,26 of a beacon is normally coded to be used with a 1000 watt incandescent lamp and thus needs to be corrected when a 400 watt metal halide lamp is used.

Although the present invention has been described with reference to preferred embodiments, workers skilled in the art will recognize that changes may be made in form and detail without departing from the spirit and scope of the invention.

What is claimed is:

1. An airport beacon for use with a source of electrical energy, the beacon comprising:
    a stationary housing having an opening;
    a rotatable lamp housing including a lens assembly mounted thereto, and a hollow drive shaft fixed to the rotatable lamp housing and aligned with an opening in the rotatable lamp housing, the drive shaft extending through the opening in the stationary housing and into the stationary housing;
    bearing means, mounted proximate the opening in the stationary housing and engaging the hollow drive shaft, for rotatably mounting the drive shaft to the stationary housing;
    an elongated lamp support extending through the hollow drive shaft and the opening in the stationary housing and having a first end fixedly mounted to the stationary housing and a second end extending through the opening in the rotatable lamp housing and into the rotatable lamp housing;
    a high intensity lamp mounted on the second end of the lamp support within the rotatable lamp housing and aligned with the lens assembly, the high intensity lamp being connected to the source of electrical energy by electrical leads extending from the high intensity lamp, through the hollow drive shaft to the source of electrical energy;
    a drive motor, coupled to the stationary housing; and
    a timing assembly coupled to the drive motor and the hollow drive shaft for rotating the hollow drive shaft around the elongated lamp support such that the rotatable lamp housing and lens assembly are rotated around the high intensity lamp.

2. The airport beacon of claim 1, further comprising circuit means for electrically coupling the high intensity lamp to the source of electrical energy, the circuit means including a transformer and a capacitor mounted within an interior of the stationary housing.

3. The airport beacon of claim 1, wherein the timing assembly comprises a gear coupled to the hollow drive shaft, and a timing belt connecting the gear to the drive motor to rotate the hollow drive shaft.

4. The airport beacon of claim 1, wherein the lamp support comprises a tube and wherein the electrical leads run through the tube for connecting the lamp to the source of electrical energy.

5. The airport beacon of claim 1, further comprising obstruction light means fixedly mounted relative to the stationary housing for providing an obstruction marker light, and circuit means electrically coupling the obstruction light means to the source of electrical energy.

6. The airport beacon of claim 5, further comprising photoelectric switch means positioned within an interior of the rotatable lamp housing and coupled to the circuit means for breaking the circuit between the source of electrical energy and the obstruction light means when the high intensity lamp is providing light.

7. The airport beacon of claim 6 wherein the photoelectric switch means is attached to the lamp support.

8. The airport beacon of claim 6 wherein the photoelectric switch means has electrical leads running through the lamp support for connecting the photoelectric switch means to the source of electrical energy.

9. The airport beacon as in claim 1, wherein the high intensity lamp is a metal halide lamp.

10. The airport beacon of claim 1, wherein the bearing means for rotatably mounting comprises a hub mounted to the stationary housing proximate the opening in the stationary housing; and
    bearings positioned in the hub to receive the drive shaft and rotatably hold the drive shaft relative to the stationary housing.

11. An airport beacon for use with a source of electrical energy, the beacon comprising:
    a stationary housing having an opening;

a rotatable lamp housing including a lens assembly mounted thereto, and a hollow drive shaft fixed to the rotatable lamp housing and aligned with an opening in the rotatable lamp housing, the drive shaft extending through the opening in the stationary housing and into the stationary housing;

a hub mounted to the stationary housing proximate the opening in the stationary housing;

bearings, positioned in the hub to receive the drive shaft and rotatably hold the drive shaft relative to the stationary housing;

an elongated lamp support extending through the hollow drive shaft and the opening in the stationary housing and having a first end fixedly mounted to the stationary housing and a second end extending through the opening in the rotatable lamp housing and into the rotatable lamp housing;

a high intensity lamp mounted on the second end of the lamp support within the rotatable lamp housing and aligned with the lens assembly, the high intensity lamp being connected to the source of electrical energy by electrical leads extending from the high intensity lamp, through the hollow drive shaft to the source of electrical energy;

a drive motor, coupled to the stationary housing; and a timing assembly including a gear coupled to the hollow drive shaft, and a timing belt connecting the gear to the drive motor to rotate the hollow drive shaft around the elongated lamp support such that the rotatable lamp housing and lens assembly are rotated around the high intensity lamp.

\* \* \* \* \*